United States Patent
Schwab (10) Patent No.: US 9,956,574 B2
(45) Date of Patent: May 1, 2018

(54) DEVICE FOR TREATING OBJECTS

(71) Applicant: EISENMANN SE, Boeblingen (DE)

(72) Inventor: Stephan Schwab, Waldenbuch (DE)

(73) Assignee: EISENMANN SE, Boeblingen, DE (US)

( * ) Notice: Subject to any disclaimer, the term of this patent is extended or adjusted under 35 U.S.C. 154(b) by 79 days.

(21) Appl. No.: 15/036,866

(22) PCT Filed: Nov. 14, 2014

(86) PCT No.: PCT/EP2014/003059
§ 371 (c)(1),
(2) Date: May 16, 2016

(87) PCT Pub. No.: WO2015/070988
PCT Pub. Date: May 21, 2015

(65) Prior Publication Data
US 2016/0325303 A1    Nov. 10, 2016

(30) Foreign Application Priority Data

Nov. 16, 2013   (DE) .......................... 10 2013 019 231

(51) Int. Cl.
*B05B 15/12* (2006.01)
*B05B 13/04* (2006.01)
(Continued)

(52) U.S. Cl.
CPC ...... *B05B 15/1214* (2013.01); *B05B 13/0452* (2013.01); *B05B 15/04* (2013.01);
(Continued)

(58) Field of Classification Search
None
See application file for complete search history.

(56) References Cited

U.S. PATENT DOCUMENTS 3,473,404 A * 10/1969 Ross ..................... B60K 20/04
74/491
4,027,361 A    6/1977 Yoneya
(Continued)

FOREIGN PATENT DOCUMENTS

AT            411 650 B      4/2004
DE          1 883 255        11/1963
(Continued)

*Primary Examiner* — Jethro M Pence (57) ABSTRACT

A device for treating objects having a treatment chamber, which has a wall having a gap extending between first and wall segments. The device includes an apparatus having at least one component which extends from outside of the treatment chamber into the treatment chamber through the gap and can be moved along the gap. A sealing assembly seals the gap leaving at least one passage opening, through which the at least one component extends. The sealing assembly includes a first and a second sealing element, which extend on the first or second wall segment along the gap and have a coupling edge, the coupling edges being complementary to each other. The coupling edges are coupled to each other and, during the movement of the at least one component, separate from each other in front of the passage opening and couple to each other behind the passage opening.

13 Claims, 7 Drawing Sheets

(51) Int. Cl.
  *B25J 11/00* (2006.01)
  *B25J 19/00* (2006.01)
  *B25J 21/00* (2006.01)
  *B05B 15/04* (2006.01)
  *F16P 1/02* (2006.01)

(52) U.S. Cl.
  CPC ....... *B05B 15/1288* (2013.01); *B25J 11/0075* (2013.01); *B25J 19/0075* (2013.01); *B25J 21/00* (2013.01); *F16P 1/02* (2013.01); *Y10S 901/43* (2013.01)

(56) References Cited

U.S. PATENT DOCUMENTS

| | | | |
|---|---|---|---|
| 4,089,270 A * | 5/1978 | Blake | B61B 13/04 |
| | | | 104/102 |
| 4,485,690 A | 12/1984 | Lipinski et al. | |
| 4,689,757 A * | 8/1987 | Downing | G07C 3/08 |
| | | | 341/101 |
| 4,892,041 A * | 1/1990 | Fukuda | B61B 5/025 |
| | | | 104/140 |
| 4,964,359 A * | 10/1990 | Richmond | F16H 59/0213 |
| | | | 116/28.1 |
| 5,031,944 A * | 7/1991 | Keyaki | A44B 19/301 |
| | | | 24/387 |
| 5,931,288 A | 8/1999 | Avery | |
| 6,397,758 B1 * | 6/2002 | Martin | E21B 19/14 |
| | | | 104/139 |
| 6,499,408 B1 * | 12/2002 | Kundel, Sr. | B61B 3/00 |
| | | | 104/111 |
| 6,725,561 B2 | 4/2004 | Link et al. | |
| 6,928,703 B2 * | 8/2005 | Petravic | A44B 19/265 |
| | | | 24/381 |
| 7,077,240 B2 * | 7/2006 | Itoh | B66B 11/0095 |
| | | | 187/249 |
| 9,004,496 B2 * | 4/2015 | Gorham | F16J 15/062 |
| | | | 277/650 |
| 2003/0140516 A1 | 7/2003 | Link et al. | |

FOREIGN PATENT DOCUMENTS

| | | |
|---|---|---|
| DE | 26 07 006 A1 | 9/1976 |
| DE | 25 21 506 A1 | 10/1976 |
| DE | 30 23 044 A1 | 1/1982 |
| DE | 32 01 058 A1 | 7/1983 |
| DE | 36 36 416 C1 | 2/1988 |
| DE | 198 48 946 A1 | 5/2000 |
| DE | 697 12 286 T2 | 9/2002 |
| DE | 102 49 243 A1 | 8/2003 |
| EP | 1 331 038 A2 | 7/2003 |
| GB | 2 094 395 A | 9/1982 |
| WO | 01/53000 A2 | 7/2001 |

\* cited by examiner

DEVICE FOR TREATING OBJECTS

RELATED APPLICATIONS

This application is a national phase of International Patent Application No. PCT/EP2014/003059, filed Nov. 14, 2014, which claims the filing benefit of German Patent Application No. 10 2013 019 231.5, filed Nov. 16, 2013, the contents of both of which are incorporated herein by reference.

FIELD OF THE INVENTION

The invention relates to a device for treating objects having
a) a treatment chamber, in which there is a wall with a first wall portion and a second wall portion, between which a gap extending in the wall is formed;
b) an apparatus, in particular a treatment apparatus or a conveying apparatus, which comprises at least one component which extends from an outside region outside the treatment chamber through the gap into the treatment chamber and can be moved along the gap;
c) a sealing arrangement, which seals the gap in the wall of the treatment chamber except for at least one through opening through which the at least one component extends and which follows a movement of the at least one component along the gap.

BACKGROUND OF THE INVENTION

For the industrial treatment of objects, in particular vehicle bodies or parts thereof, in which it is necessary to move large numbers of units, it is preferable to use such devices in which the objects are guided continuously or discontinuously through the treatment chamber with the aid of a conveying apparatus. Such devices have a high capacity and can be readily integrated in a production line. A treatment can be for example a painting treatment or a drying treatment.

The walls of the treatment chamber, which in the present case refer both to side walls as well as a bottom wall and a top wall, separate the external atmosphere from the internal atmosphere of the treatment chamber and, in particular, prevent the escape of any applied treatment medium and/or heat from the treatment chamber. The wall having the gap can be such a wall of the treatment chamber. However, it can also be a wall of a housing of some other assembly which is arranged in the treatment chamber. For example, the wall can belong to the housing of a cover for a guideway on which an application robot is moved. The housing then also covers drive components of this robot, for example, in order to protect them from the influence of the atmosphere of the treatment chamber.

The treatment medium can be a treatment fluid, as is for example is the case when painting objects or in preparation processes for painting. However, without any further measures, it is essentially possible for gases and vapours, such as those which may be present for example in driers or spray booths, to also escape from the treatment chamber. In spray booths, fluid or powder mists, for example, should moreover also be kept from the environment of the treatment chamber.

The walls of the treatment chamber should moreover also prevent contamination from the outside from penetrating into the treatment chamber.

The apparatus of which at least one component extends through the gap in the wall into the treatment chamber can be for example a treatment apparatus and in this case, for example, a multi-axle application robot, such as is known per se. A robot of this type comprises electrical lines and fluid lines which are guided as a line bundle from the outside into the treatment chamber to the robot arm and follow this latter during a movement. The robot arm guides an application apparatus, for example a spray gun or a rotary atomiser, at the end which is located inside the treatment chamber.

It is also optionally possible for the robot arm itself to be that component which extends from outside the treatment chamber to through the gap into the treatment chamber, whilst the drive component of the robot—for example, amongst other things, carriage which can be moved parallel to the wall and has corresponding motors—is arranged on the other side of the wall.

The apparatus of which at least one component extends through the gap in the wall into the treatment chamber can, for example, also be a conveying apparatus. In this case, it is ensured in particular that those elements of the conveyor from which contaminants can possibly emanate, in particular the drive components, are arranged outside the treatment chamber. To carry the objects, possible conveyors must have a carrying arm which penetrates through the wall of the treatment chamber and on which the objects can be fastened at its end which is located in the treatment chamber. The gap in the wall of the treatment chamber is provided for this purpose, which gap extends along the movement path of the conveyor and is closed except for the special sealing arrangement. In a conveying apparatus of this type, the carrying arm is therefore the component defined above, which extends from outside the treatment chamber through the gap into the treatment chamber and can be moved along the gap.

In known devices of the type mentioned at the outset, in which, accordingly, the sealing arrangement can open locally in the region of the carrying arm, resilient sealing lips are frequently used as sealing arrangements, which sealing lips surround the carrying arm from two opposing sides and are intended to abut loosely against one another where the carrying arm of the conveying apparatus is not located.

However, the reliability of such sealing lips is not always ensured. In particular, where the carrying arm is not located, it is possible that clearances will remain between the sealing lips, through which unwanted impurities can arrive in the treatment chamber or the atmosphere can reach the outside from the treatment chamber.

Another such treatment device is described in DE 198 48 946 C2. In this, the sealing arrangement comprises a plurality of adjacently arranged, segment-like sealing elements which overlap one another in the lateral direction and are pivoted about pivot axes for a carrying arm of a conveying apparatus to pass through. However, this solution is mechanically very complex. DE 192 49 243 B1 instead discloses the use of resiliently deformable flexible lamellae for sealing the carrying arm of a conveying apparatus. However, this is also structurally very complex due to the number of individual parts.

The term "seal" does not necessarily refer to a hermetic sealing of the adjacent regions in the present case. The aim is to seal the gap to an acceptable residual permeability, which can vary from installation to installation. The outside region can optionally be acted upon by an overpressure so that it is more difficult for the atmosphere of the treatment chamber to escape outside through the sealing arrangement.

SUMMARY OF THE INVENTION

An object of the present invention is to design a device of the type mentioned at the outset so that the gap between the two portions of the wall is reliably sealed and the sealing arrangement is low-maintenance and reliable.

This object may be achieved in a device of the type mentioned at the outset in that d) the sealing arrangement comprises:
   da) a first sealing element, which extends on the first wall portion along the gap and has a coupling edge which is remote from the first wall portion;
   db) a second sealing element, which extends on the second wall portion along the gap and has a coupling edge which is remote from the second wall portion and is complementary to the coupling edge of the first sealing element;
e) the sealing arrangement is designed in such a way that
   ea) the coupling edges are coupled to one another except for the through opening;
   eb) during the movement of the at least one component, the coupling edges separate from one another in front of the through opening in the movement direction of the component and couple to one another behind the through opening in the movement direction.

Therefore, according to the invention, sealing elements are used which, unlike the above-mentioned sealing lips, are connected to one another in the portions in which the through opening is not located. This prevents unwanted gaps from being able to form there, such as can be the case with sealing lips which abut loosely against one another.

The sealing arrangement preferably comprises a first and a second slide element with the aid of which the coupling edges can be brought into engagement with one another or separated from one another depending on the movement direction, with the through opening remaining between the slide elements.

If the coupling edges have mutually complementary rows of teeth, which can be brought into engagement with one another or separated from one another depending on the movement direction, the sealing arrangement can advantageously be constructed in the manner of a zip closure.

It is alternatively favourable if the coupling edges have mutually complementary tear strips which form a tongue and groove system.

If the tear strips here each comprise a double groove and a double tongue, a high sealing capacity is possible in the portions in which the coupling edges are coupled to one another.

A reliable guidance of the components passing through the gap is ensured if the sealing arrangement comprises a sliding body which is arranged in the through opening and receives at least one component of the apparatus.

So that the movement of the sliding body and the coupling or decoupling procedure for the coupling edges can be matched to one another, it is favourable if the sliding body is connected to the slide elements on both sides in the movement direction. This connection can also be integral; in this case, the slide elements are therefore integrated in the sliding body.

The sliding body advantageously has a lenticular cross-section in the plane of the sealing arrangement. During a movement of the sliding body, the coupling edges are thus firstly guided away from one another and then back towards one another, thereby generating the through opening which, in this case, follows the contour of the sliding body.

In its outside edges which face the coupling edges, the sliding body preferably has a respective groove in which the coupling edges are guided during a movement of the sliding body. This prevents the coupling edges from escaping in a direction which is perpendicular to the movement direction.

To reduce possible negative influences from the atmosphere in the treatment chamber on the coupling edges, it is favourable if the sealing arrangement comprises a cover means which protects the coupling edges in the treatment chamber.

The cover means here can advantageously comprise a cover strip on each sealing element, which extend in each case over the to associated coupling edge and are arranged and dimensioned in such a way that they overlap in the region of the mutually coupled coupling edges.

It is to be understood that the aspects and objects of the present invention described above may be combinable and that other advantages and aspects of the present invention will become apparent upon reading the following description of the drawings and detailed description of the invention.

BRIEF DESCRIPTION OF THE DRAWINGS

Exemplary embodiments of the invention are explained in more detail below with reference to the drawings, which show.

DETAILED DESCRIPTION OF THE PRESENT INVENTION

While this invention is susceptible of embodiment in many different forms, there is shown in the drawings and will herein be described in detail one or more embodiments with the understanding that the present disclosure is to be considered as an exemplification of the principles of the invention and is not intended to limit the invention to the embodiments illustrated.

Figure 1:
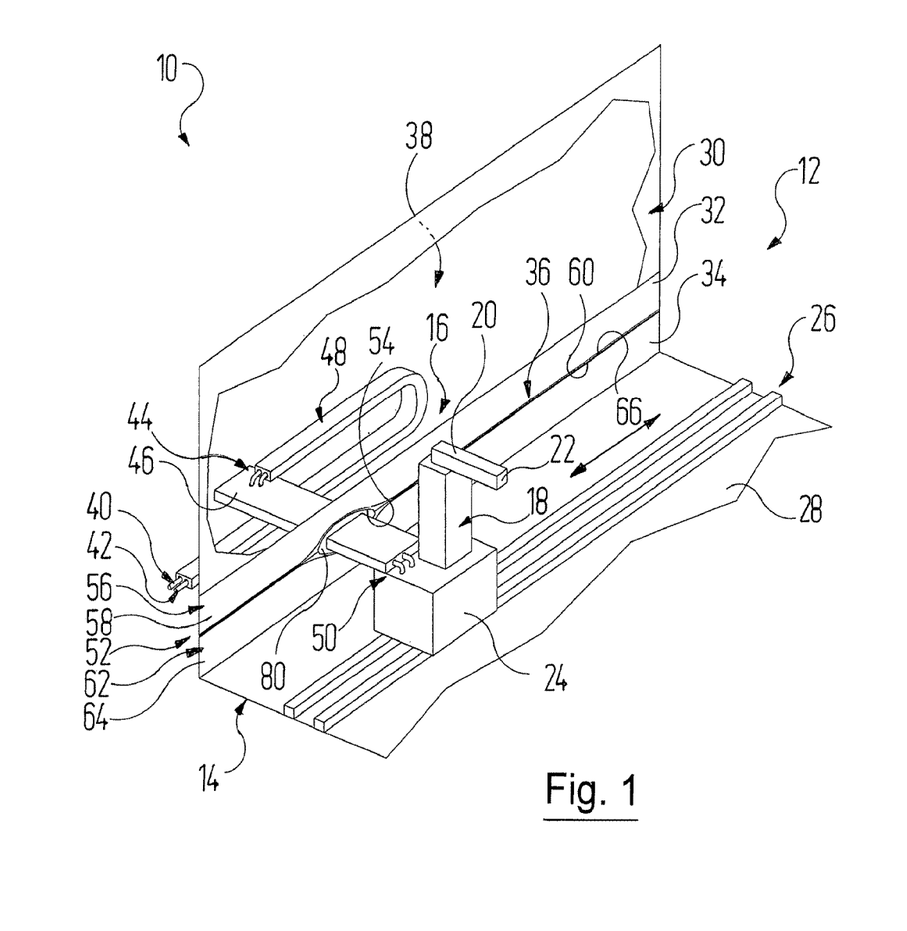
FIG. 1 a perspective view of a detail of a paint booth with a partially broken-away wall, wherein a line bundle for supplying a paint robot is guided through the wall and a through opening of a sealing arrangement, which paint robot can be moved in the paint booth and is shown in a first end position on its movement path.

In FIG. 1, a device for treating objects, which comprises a treatment chamber 12, is denoted as a whole by 10. In the present exemplary embodiment, the treatment chamber 12 belongs to a paint booth 14 in which objects are painted and of which only a detail is shown.

Arranged in the treatment chamber 12, there is a treatment apparatus 16 which, in the present exemplary embodiment, is formed by a multi-axle robot 18 which is illustrated in highly schematic form and is known per se. The paint robot 18 comprises a robot arm 20 which, at its free end, guides an application apparatus 22 which can be for example a spray gun or a rotary atomiser.

The robot arm 20 is arranged on a carriage 24 which can be moved on rails 26 in the treatment chamber 12 and, to this end, carries along drive components in known manner, which are not shown separately here.

The treatment chamber 12 is delimited by walls of which a bottom wall 28 and a vertical side wall 30 are shown. The side wall 30 has a first wall portion 32, which is an upper wall portion in the present exemplary embodiment, and a second wall portion 34, which is a lower wall portion in the present exemplary embodiment, these wall portions being separated from one another by a horizontally extending gap 36.

On the side of the side wall 30 which is remote from the treatment chamber 12, there is an outside region 38 outside the treatment chamber 12 of the paint booth 14 from which the paint robot 18 is supplied with operating resources such as electrical energy, fluid media and the like, which are required to operate the paint robot 18 and to paint the objects. To this end, supply lines are guided to the paint robot 18, of which two electrical lines 40 and two fluid lines 42 are provided with reference numerals in FIGS. 3, 4 and 5 by way of example.

The lines 40 and 42 are part of a line bundle (denoted as a whole by 44) of the paint robot 18, which can also comprise further supply lines which are not referenced specifically. The line bundle 44 extends from the outside region 38 through the gap 36 into the treatment chamber 12 and leads to the paint robot 18. The line bundle 44 in the present exemplary embodiment comprises a tube-like sleeve 46, although it can also be formed without a sleeve 46 of this type by the individual lines 40, 42 and further elements, as shown in FIGS. 3 to 6. In the outside region 38, the lines 40, 42 are guided to the sleeve 46 with the aid of a movable drag device 48 which is known per se.

Figure 2:
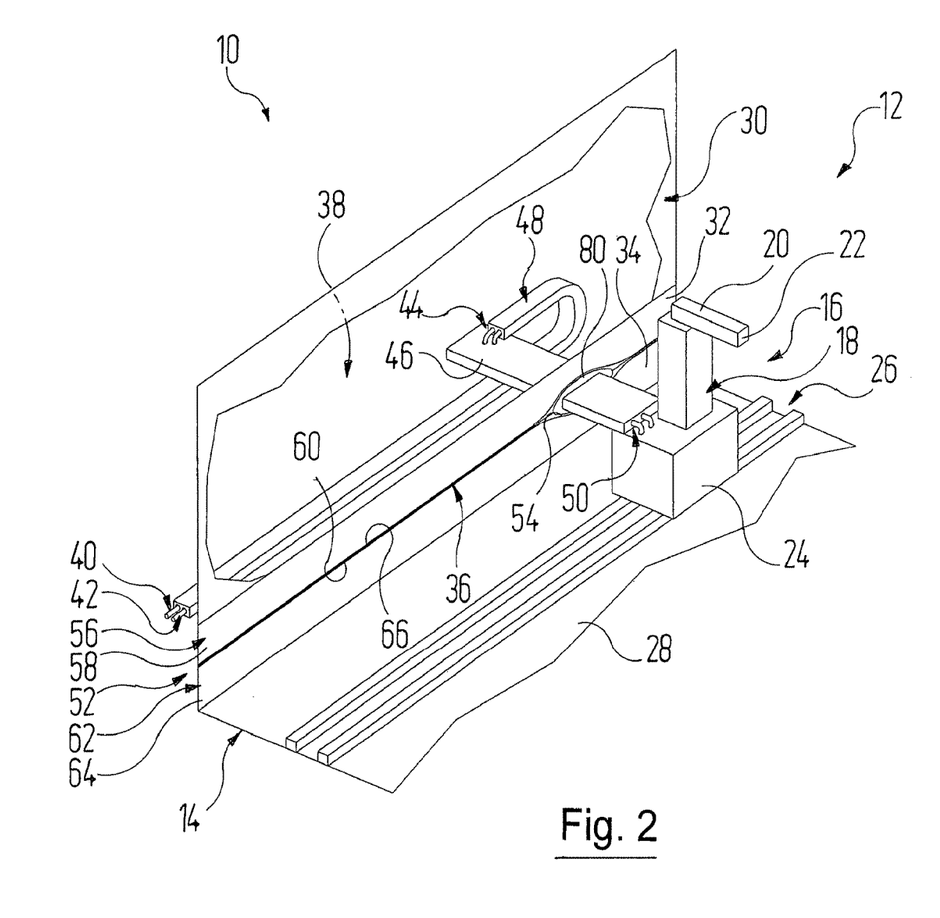
FIG. 2 a perspective view, corresponding to FIG. 1, of the paint booth, with the paint robot in its second end position on its movement path.

The line bundle 44 can move along the gap 36 and follow the movement of the paint robot 18. The rails 26 in the treatment chamber 12 provide a movement path for the paint robot 18 here, on which this latter can move between a first end position, which is shown in FIG. 1, and a second end position, which is shown in FIG. 2.

In general terms, the line bundle 44 in the present exemplary embodiment forms a component 50 which extends from outside the treatment chamber 12 through the gap 36 into the treatment chamber 12 and can be moved along the gap 36.

As explained at the outset, the intention is to substantially prevent atmosphere from the treatment chamber 12 arriving in the outside region 38 or arriving from this latter in the treatment chamber 12. For this reason, a sealing arrangement 52 is present, which seals the gap 36 in the wall 30 of the treatment chamber 12 except for a through opening 54 through which the line bundle 44 extends and which follows a movement of the line bundle 44 along the gap 36.

The sealing arrangement 52 comprises a first sealing element 56 in the form of a first sealing strip 58, which extends on the upper wall portion 32 along the gap 36 and has a coupling edge 60 which is remote from the upper wall portion 32. The sealing arrangement 52 moreover comprises a second sealing element 62 in the form of a second sealing strip 64 which extends on the second wall portion 34 along the gap 36 and has a coupling edge 66 which is remote from the second wall portion 34 and is complementary to the coupling edge 60 of the first sealing element 56.

The line bundle 44 extends through the through opening 54 and the coupling edges 60 and 66 are coupled to one another except for the through opening 54. If the line bundle 44 moves in the gap 36, the coupling edges 60 and 66 couple to one another behind the line bundle 44 in the movement direction and separate from one another in front of the line bundle 44 in the movement direction. The movement direction is only shown in FIG. 1 as a double-headed arrow.

Figure 3:
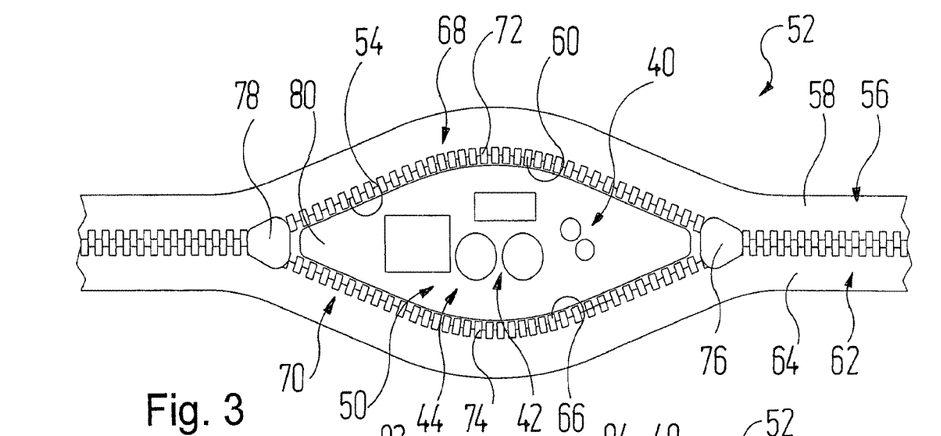
FIG. 3 a plan view of a detail of the sealing arrangement in the region of the through opening.

As shown in FIG. 3, this is enabled in the present exemplary embodiment in that the coupling edges 60, 66 have mutually complementary rows of teeth 68 and 70, having teeth 72 and 74, in the manner of a zip closure. With the aid of a first slide element 76 and a second slide element 78, the coupling edges 66, 66 can be brought into engagement with one another or separated from one another depending on the movement direction. The through opening 54 for the line bundle 44 remains between the two slide elements 76 and 78 here.

The sealing arrangement 52 moreover comprises a sliding body 80 which is arranged in the through opening 54 and receives the line bundle 44. The sliding body 80 is connected to the slide elements 76 and 78 on both sides in the movement direction and has a lenticular cross-section in the plane of the sealing arrangement 52 so that the coupling edges 60, 66 firstly move away from one another and then back towards one another during a movement of the sliding body 80.

Figure 4:
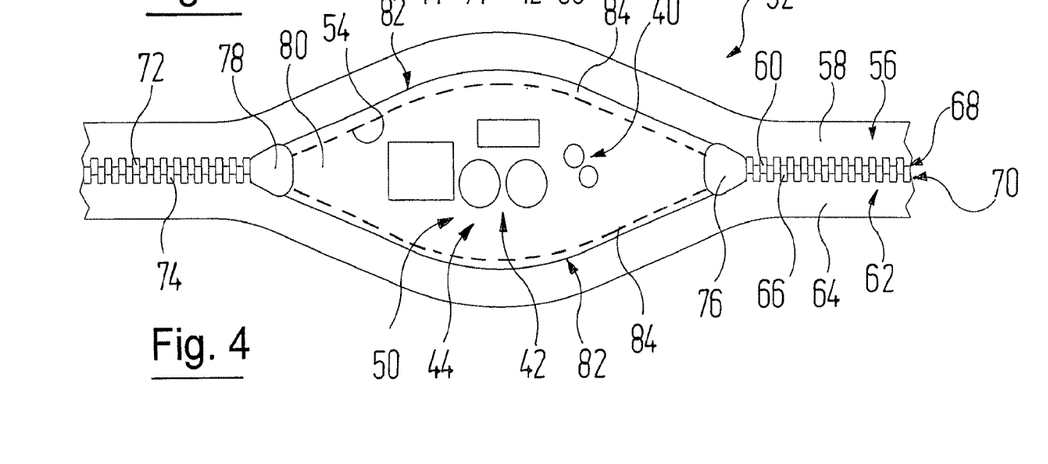
FIG. 4 a plan view, corresponding to FIG. 3, of a detail of a modified sealing arrangement in the region of the through opening.

In a modification shown in FIG. 4, the sliding body 80 is integrally connected to the slide elements 76 and 78. Moreover, at its outside edges 82 facing the coupling edges 60 and 66, i.e. the rows of teeth 68 and 70 in the present exemplary embodiment, the sliding body 80 has a respective groove 84 in which the coupling edges 60, 66 are guided during a movement of the sliding body 80. A groove 84 of this type can also be present when the slide elements 76, 78 are not integrally connected to the sliding body 80.

Figure 5:
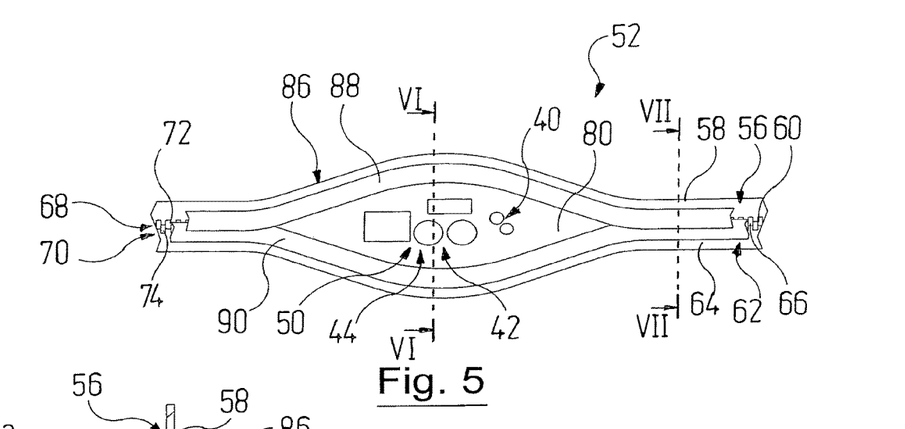
FIG. 5 a plan view, corresponding to FIG. 3, of a detail of an again modified sealing arrangement in the region of the through opening.
Figure 6:
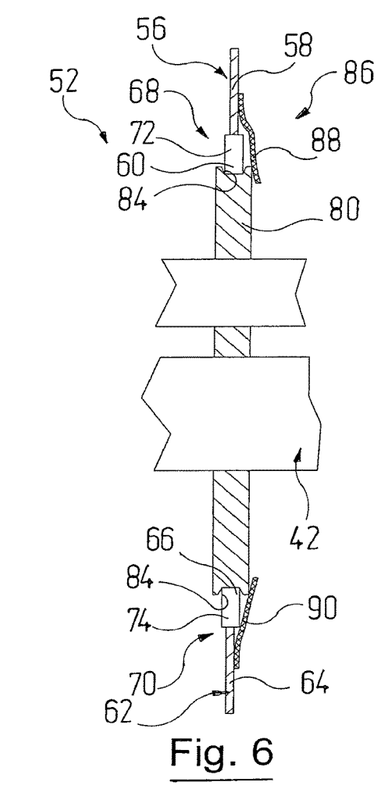
FIG. 6 a section of the sealing arrangement of FIG. 5, according to the section line VI-VI therein, on a larger scale.
Figure 7:
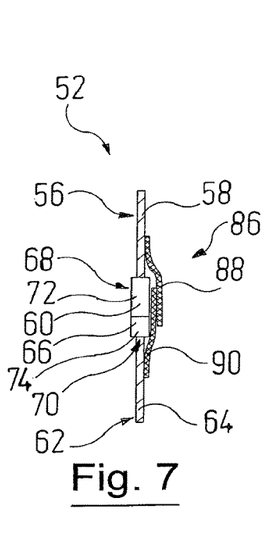
FIG. 7 a section of the sealing arrangement of FIG. 5, according to the section line VII-VII therein, likewise on a larger scale.

In FIGS. 5 to 7, a supplemented sealing arrangement 52 is shown, in which the rows of teeth 68 and 70 in the treatment chamber 12 are protected by a cover means 86. To this end, fastened to each sealing strip 58, 64, is a cover strip 88, 90 which extend in each case over the associated row of teeth 68 and and are arranged and dimensioned in such a way that they overlap in the region of the mutually coupled rows of teeth 68, 70. This is clearly shown in FIGS. 5 and 7. In addition to the mechanical protective effect, the cover strips 88, 90 can also have sealing properties and therefore additionally contribute to the overall leak-tightness of the sealing arrangement 52.

Figure 8:
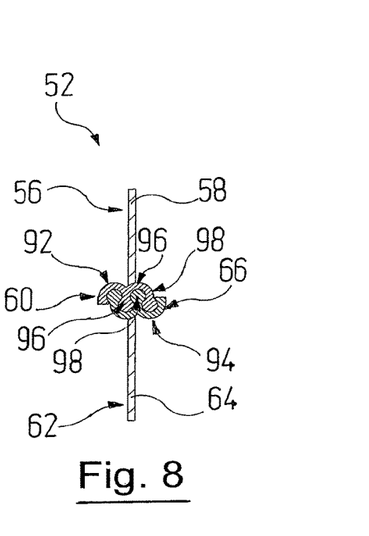
FIG. 8 a section corresponding to FIG. 7 of an again modified sealing arrangement.

FIG. 8 shows a sealing arrangement 52 as a further exemplary embodiment, in which the coupling edges 60 and 66 do not have rows of teeth in each case, but mutually complementary tear strips 92 and 94 which form a tongue and groove system. The tear strips 92 and 94 are M-shaped in cross-section and therefore each have a double groove 96 in which a double tongue 98 of the other tear strip 92 or 94 in each case can engage. The slide element 76 and 78 match the tear strips 92, 94 accordingly.

In the FIGS. 9, 10 and 11 explained below, not all of the components explained above are provided with a reference numeral for the sake of simplicity.

Figure 9:
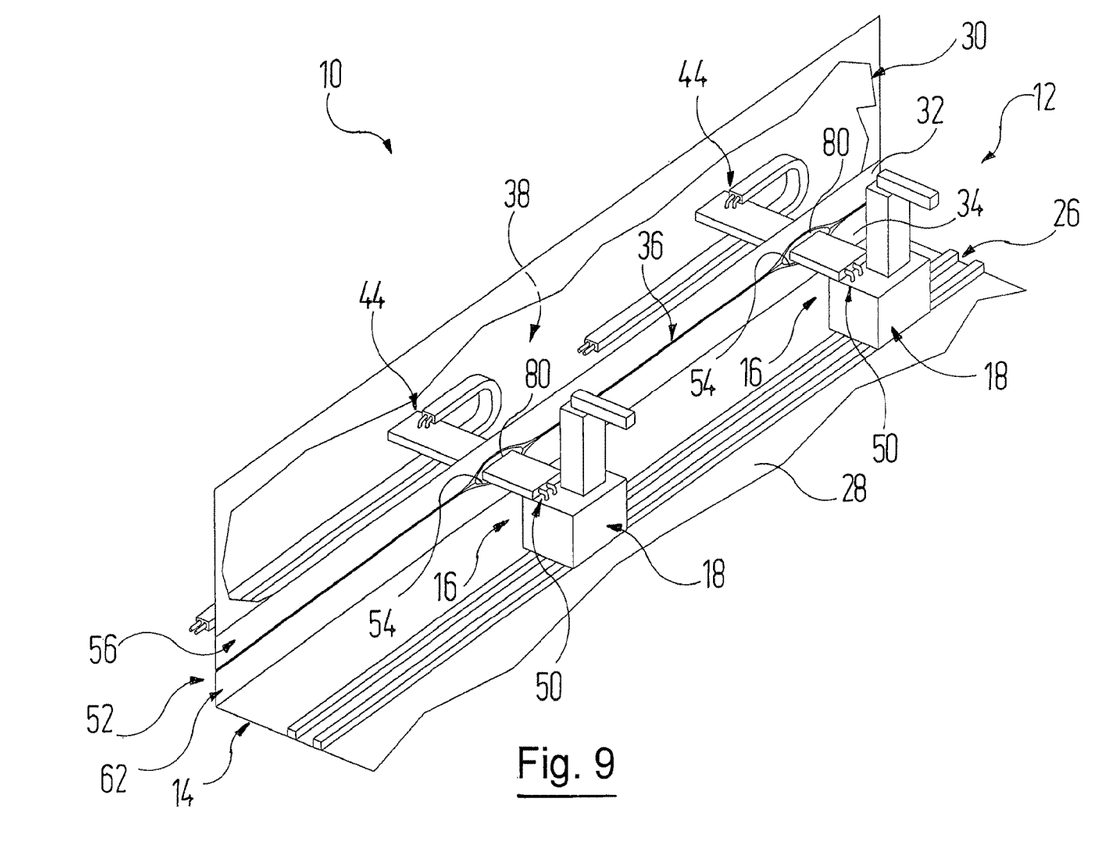
FIG. 9 a perspective view, corresponding to FIG. 1, of the paint booth, with a sealing arrangement which is designed for two or more paint robots which can be moved in the longitudinal direction of the paint booth, arranged in succession.

As shown in FIG. 9, paint robots 18, i.e. two treatment apparatuses 16, can also be arranged in the treatment chamber 12. In this case, the sealing arrangement 52 can also have two through openings 54 through which a line bundle 44 can pass in each case.

Figure 10:
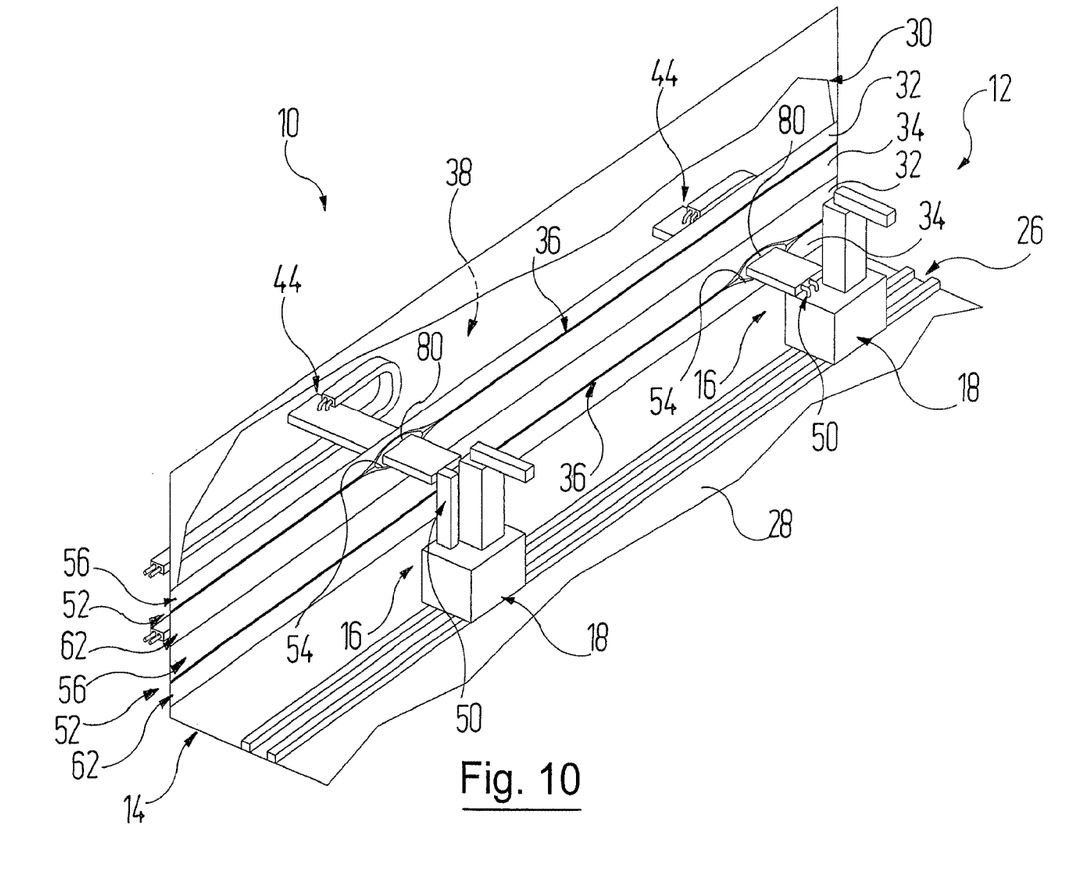
FIG. 10 a perspective view, corresponding to FIG. 9, of the paint booth, with an again modified sealing arrangement for two or more paint robots.

As FIG. 10 shows, it is also alternatively possible to have two sealing arrangements 52 with only one through opening 54 in each case which, in the exemplary embodiment shown in FIG. 10, are located at different heights. The wall here has two gaps 36 accordingly.

Figure 11:
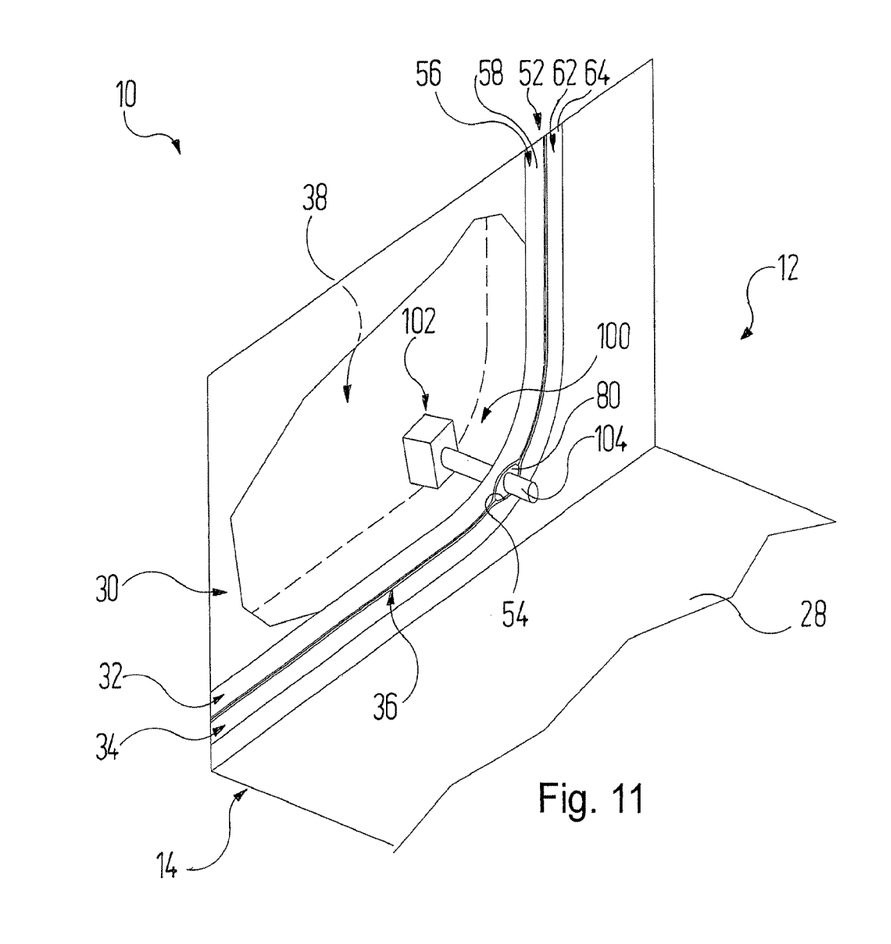
FIG. 11 a perspective view, similar to FIG. 1, of a paint booth, wherein a possible curved path is shown in greatly simplified form using an example of a conveying apparatus.

FIG. 11 shows that, with the aid of the sealing arrangement 52, it is also possible for a component which extends from the outside region 38 through the gap 36 and the sealing arrangement 52 into the treatment chamber 12 to be guided along a curved path. The gap 36 then extends in a curve which the sealing elements 56 and 62 follow.

This is shown in FIG. 11 with reference to a conveying apparatus 100 in which drive components 102 (which are shown schematically as a compact block) are arranged in the outside region 38 and a carrying arm 104 extends through the gap 36 in the wall 30 and the sealing arrangement 52 into the treatment chamber 12. The sliding body 80 receives this carrying arm 104 in the through opening 54. The gap 36 can of course also extend linearly in the case of a conveying apparatus 100.

A fastening apparatus (not shown specifically) for the objects to be conveyed is mounted at the end of the carrying arm 104 which is located in the treatment chamber 12. The objects can be conveyed for example through immersion tanks in the treatment chamber 12 or past paint robots 18 with the aid of the conveying apparatus 100. In a conveying apparatus 100 of this type, the carrying arm 104 is that component which extends through the through opening 54 in the sealing arrangement 52, which in turn follows a movement of the carrying arm 104 along the gap 36.

It is to be understood that additional embodiments of the present invention described herein may be contemplated by one of ordinary skill in the art and that the scope of the present invention is not limited to the embodiments disclosed. While specific embodiments of the present invention have been illustrated and described, numerous modifications come to mind without significantly departing from the spirit of the invention, and the scope of protection is only limited by the scope of the accompanying claims.

The invention claimed is:

1. A device for treating objects comprising:
   a) a treatment chamber, in which there is a wall with a first wall portion and a second wall portion, between which a gap extending in the wall is formed;
   b) an apparatus, which comprises at least one component which extends from an outside region outside the treatment chamber through the gap into the treatment chamber and is moved along the gap;
   c) a sealing arrangement which seals the gap in the wall of the treatment chamber except for at least one through opening through which the at least one component extends and which follows a movement of the at least one component along the gap; wherein
   d) the sealing arrangement comprises
   da) a first sealing element which extends on the first wall portion along the gap and has a coupling edge which is remote from the first wall portion; and
   db) a second sealing element, which extends on the second wall portion along the gap and has a coupling edge which is remote from the second wall portion and is complementary to the coupling edge of the first sealing element; and
   e) the sealing arrangement is designed in such a way that
   ea) the coupling edges are coupled to one another except for the through opening; and
   eb) during the movement of the at least one component, the coupling edges separate from one another in front of the through opening in a movement direction of the component and couple to one another behind the through opening in the movement direction.

2. The device according to claim 1, wherein the sealing arrangement comprises a first slide element and a second slide element configured to aid coupling of the coupling edges, wherein the coupling edges are configured to be brought into engagement with one another or separated from one another depending on a movement direction, with the through opening remaining between the first slide element and the second slide element.

3. The device according to claim 1, wherein the coupling edges have mutually complementary rows of teeth which can be brought into engagement with one another or separated from one another depending on a movement direction.

4. The device according to claim 1, wherein the coupling edges have mutually complementary tear strips which form a tongue and groove system.

5. The device according to claim 4, wherein the tear strips each comprise a double groove and a double tongue.

6. The device according to claim 2, wherein the sealing arrangement comprises a sliding body which is arranged in the through opening and which receives at least one component of the apparatus.

7. The device according to claim 6, wherein the sliding body is connected to the first slide element on a first side thereof and the second slide element on a second side thereof.

8. The device according to claim 7, wherein the sliding body has a lenticular cross-section in a plane of the sealing arrangement.

9. The device according to claim 6, wherein on its outside edges facing the coupling edges, the sliding body has a respective groove in which the coupling edges are guided during a movement of the sliding body.

10. The device according to claim 1, wherein the sealing arrangement comprises a cover means with which the coupling edges in the treatment chamber are protected.

11. The device according to claim 10, wherein the cover means comprises a cover strip on each of the first sealing element and the second sealing element, wherein each of the cover strips extend over the associated coupling edge, respectively, and wherein each of the cover strips are arranged and dimensioned such that they overlap in a region in which the coupling edges are mutually coupled.

12. The device according to claim 1, wherein the sealing arrangement comprises a sliding body which is arranged in the through opening and which receives at least one component of the apparatus.

13. The device according to claim 12, wherein on outside edges of the sliding body facing the coupling edges, the sliding body has a respective groove in which each of the coupling edges are guided during a movement of the sliding body.

* * * * *